United States Patent [19]
Daly et al.

[11] 3,890,082
[45] June 17, 1975

[54] INJECTION MOLDING APPARATUS

[75] Inventors: Richard H. Daly, Wood Dale; Robert V. Brink, Carpentersville; Kare Andersen, Elgin, all of Ill.

[73] Assignee: Chicago Rawhide Manufacturing Company, Elgin, Ill.

[22] Filed: June 11, 1973

[21] Appl. No.: 368,996

Related U.S. Application Data

[62] Division of Ser. No. 216,094, Jan. 7, 1972, Pat. No. 3,746,491.

[52] U.S. Cl. ............................ 425/451.9; 249/166
[51] Int. Cl. .............................................. B29c 3/02
[58] Field of Search ........... 164/326, 328; 425/233, 425/246, 450; 264/328; 249/161, 166

[56] References Cited
UNITED STATES PATENTS

| | | | |
|---|---|---|---|
| 2,126,738 | 8/1938 | Corbin | 164/326 X |
| 2,526,797 | 10/1950 | Ashbaugh | 425/246 |
| 2,573,123 | 10/1951 | Weiss | 264/328 X |
| 3,127,644 | 4/1964 | Fleckenstein | 164/325 |
| 3,590,426 | 7/1971 | Nowicki | 425/246 |
| 3,621,533 | 11/1971 | Bertrandi | 425/246 X |
| 3,806,296 | 8/1971 | Aoki | 425/246 |

*Primary Examiner*—Francis S. Husar
*Assistant Examiner*—Joan S. Brown

[57] ABSTRACT

An apparatus for molding articles from rubber or like moldable material. The apparatus preferably includes a plurality of molding stations disposed about the periphery of a turntable or the like. Each molding station includes a frame assembly having means thereon for receiving pairs of separable mold parts supported on the receiving means and movable along a given axis to a closed position of the mold parts. The receiving means also includes a pair of relatively movable elements normally urged apart by a spring, and a lock is provided for cooperation with one of the elements and a portion of the station frame so that one of the elements may be urged into a locked positioned, and whereby the force may be exerted through the spring onto one mold part to maintain the mold in a closed position. The entire molding station is movable as a unit into a position of registry with a clamping assembly which is capable of applying a much higher force thereto during injection of the moldable material. The individual stations are mounted for free but limited movement within the clamping assembly to relieve the turntable of clamping stresses and the individual stations are likewise readily removable for replacement or for processing of mold parts.

8 Claims, 6 Drawing Figures

INJECTION MOLDING APPARATUS

This is a division of application Ser. No. 216,094, filed Jan. 7, 1972 and now U.S. Pat. No. 3,746,491.

BACKGROUND OF THE INVENTION

The present invention relates to an injection molding apparatus and more particularly, to an apparatus which contains a plurality of individual mold stations mounted for movement about a single axis and able to be moved successively into a position of registry with a mold clamping assembly and an injection head. According to the invention, each of the mold assemblies is able to be opened and closed individually, and is able to be held in a closed position under a low force, as well as being able to be clamped under a much higher force during the time a fluent material is injected into the mold and to be held under the higher force is only a short time thereafter.

Multiple station injection molding machines are well known in the prior art, and are generally of two or three basic types. In one type of machine, plural stations are spaced apart about the periphery of a turntable or the like, and each station includes its own closing and clamping means, normally in the form of a hydraulic piston and cylinder assembly. In such a construction, individual stations are adapted to generate all the closing force required to maintain the mold parts in a closed position during injection of the material.

Inasmuch as it was recently recognized that great clamping forces are required only during the time the material is injected into the molds and perhaps for a short time thereafter, and that less forces are required to keep the mold parts closed while curing was being completed, a number of machines were proposed and built in which the pistons and cylinders used to close the molds prior to injection and to maintain them in the closed position after injection were supplemented by a large single piston and cylinder assembly which applied a great deal of additional closing force during material injection and for only a short time thereafter. In the use of such injection molding presses, small forces would be applied to movable mold parts for closing the molds, the molds would be successively indexed to a position of registry with a large clamping assembly, the high force clamping assembly would apply a much higher force to the closed individual mold, injection of the material would take place, the large force would be released, and the turntable or other carrier would be advanced to the next succeeding station for repetition of the same steps in respect to a following mold, while the molds containing the just-formed part would be maintained closed under the lower force for a substantial additional period, after which the individual molds would be opened for part removal and reloading, if necessary.

In such constructions, there was commonly at least one disadvantage, namely, that the application of the higher force acted to apply a bending or other undesirable moment to the turntable or the like. This was compensated for in some cases, by providing means for lifting the turntable to a position of registry with the large clamp, by reinforcing the turntable, or by other means, all of which added expense and weight to the apparatus and would cause it to operate more slowly. Recently, however, an improvement over either of the two types of prior art machines just discussed was made wherein the machine was constructed so that the individual mold assembly could "float" or move freely within a limited distance while the large clamping force is applied thereto. Such a construction is described in the Bertrandi U.S. Pat. No. 3,621,533 issued Nov. 23, 1971.

This type of apparatus has a number of advantages in respect to prior art units, however, certain features thereof are still capable of improvement or refinement. For example, the individual molds were normally closed hydraulically, and therefore, the individual stations were difficult to remove without disabling the entire hydraulic system, which required purging or bleeding the system and refilling the same thereafter. Such stations could not be individually removed for treatment in an associated apparatus, for example.

In some cases, especially where molding was carried out at high temperatures, the individual hydraulic systems were exposed to excessive heat, which is undesirable in a hydraulic system, particularly one which generates considerable heat by its own operation. In some cases, the plural hydraulic systems were very noisy and sometimes unreliable in use, requiring numerous pressure regulation air ducts, etc.

In certain cases, the positioning of the hydraulic components of the individual mold station presented a space problem, that is, a subassembly was of considerable axial extent and therefore, imposed on the high force clamping assembly the requirement of a large axial gap. This in turn required unduly massive frame elements to withstand bending stresses imposed during use.

In view of the foregoing and other limitations of certain prior art multiple station molding machines, it is an object of the present invention to provide an improved molding apparatus.

A further object is to provide an apparatus having a plurality of individual molding stations adapted to be held closed under a relatively smaller force and adapted to be positioned for clamping under a high force, with each individual station having associated therewith spring means for maintaining it in the closed position.

A further object is to provide an improved multi-station molding apparatus having plural individual stations supported for movement on a turntable and capable of ready removal therefrom.

A still further object is to provide a molding apparatus in which means are provided in each individual station for maintaining the mold in a locked position, but in which the means for applying the locking force are separate from the individual stations and from the large clamping station as well.

A further object is to provide such an apparatus wherein means are provided for mechanically locking and unlocking the molds under a predetermined force after each mold is subjected to a separately applied closing force.

A still further object is the provision of a mold closing apparatus in which the individual stations are able to be adjusted for uniformity of applied closing force in a simple manner.

A still further object is to provide such an apparatus in which individual cylinders are provided for locking and unlocking the molding stations, and in which positive acting means are also provided for opening the molds after release of the clamping forces applied thereto.

The objects and advantages of the present invention are achieved in practice by providing an injection molding apparatus having a plurality of individual molding stations each including separable mold parts, means for injecting a charge of a fluent curable material into the mold parts, means for supporting the individual molding stations for free but limited movement as a unit, means forming a part of each station for mechanically maintaining the mold parts in their closed positions under a reduced force, means for clamping the mold assembly under a greatly increased force for injection of the fluent material into the molds, and means for locking and unlocking each mold so as to permit the mold parts to remain closed under the reduced force after the force applied by the clamping means has been released.

The manner in which these and other objects are achieved in practice will become more apparent when reference is made to the accompanying detailed description of the preferred embodiments of the invention set forth by way of example and shown in the accompanying drawings, in which like reference numerals indicate corresponding parts throughout.

DESCRIPTION OF THE PREFERRED EMBODIMENTS OF THE INVENTION

Although it will be understood that the principles of the invention may be applied to various forms of apparatus, a description of the invention will be made in reference to a construction wherein the molding stations are supported on a rotatable turntable, in which the mold closing and clamping is carried out hydraulically, in which the mold stations "float" along a vertical axis, wherein the lower force holding the mold closed is mechanically applied, and in which mold opening and closing as well as injection takes place coaxially with one another.

Figure 1:
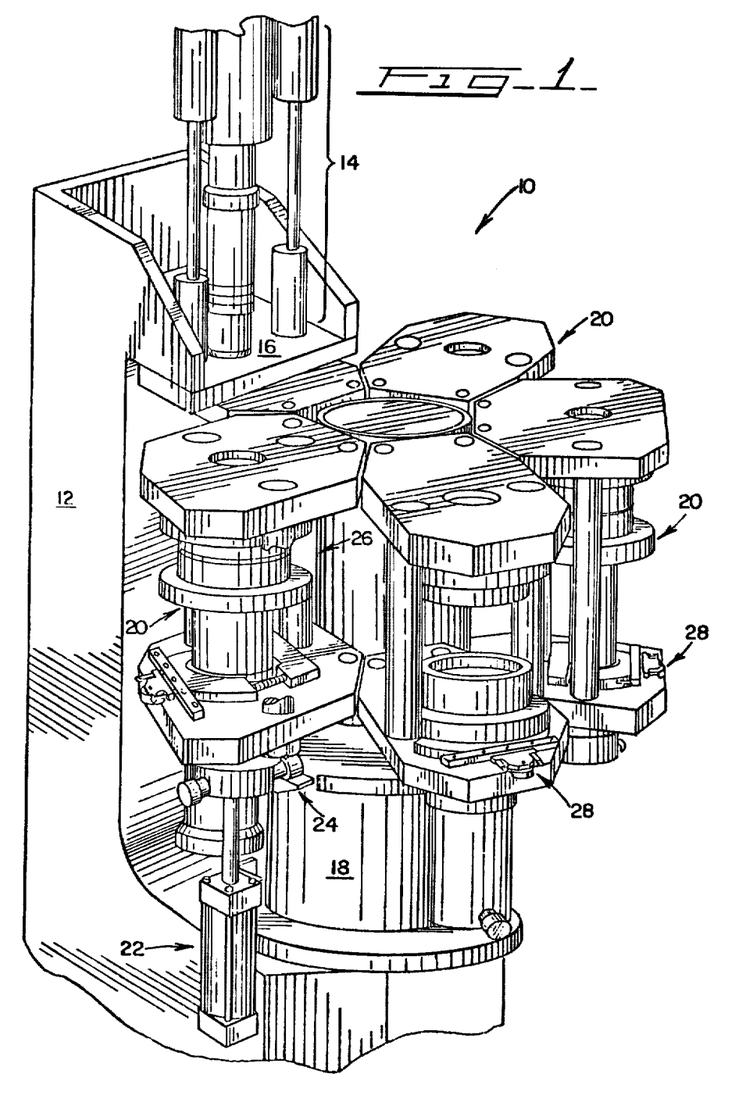
FIG. 1 is a perspective view of the molding apparatus of the invention, with certain portions thereof broken away and showing the main clamping frame, the injection head unit and a plurality of individual mold units supported for rotation about a central column.

Referring now in detail to FIG. 1, the invention is shown to be typically embodied in a molding apparatus generally designated 10 and including a number of principal assemblies including a high force clamping frame 12, a molding material injector assembly generally designated 14 and secured atop an upper plate portion 16 of the frame 12, and a rotatable turntable unit 18, having five individual molding stations 20 mounted thereon in a manner to be described in detail elsewhere herein. The molding apparatus is also shown to include an auxiliary mold closing piston and cylinder assembly 22, a support rail element 24, a mold unit 26 in each station 20, and a locking apparatus 28 for each station 20.

Figure 2:
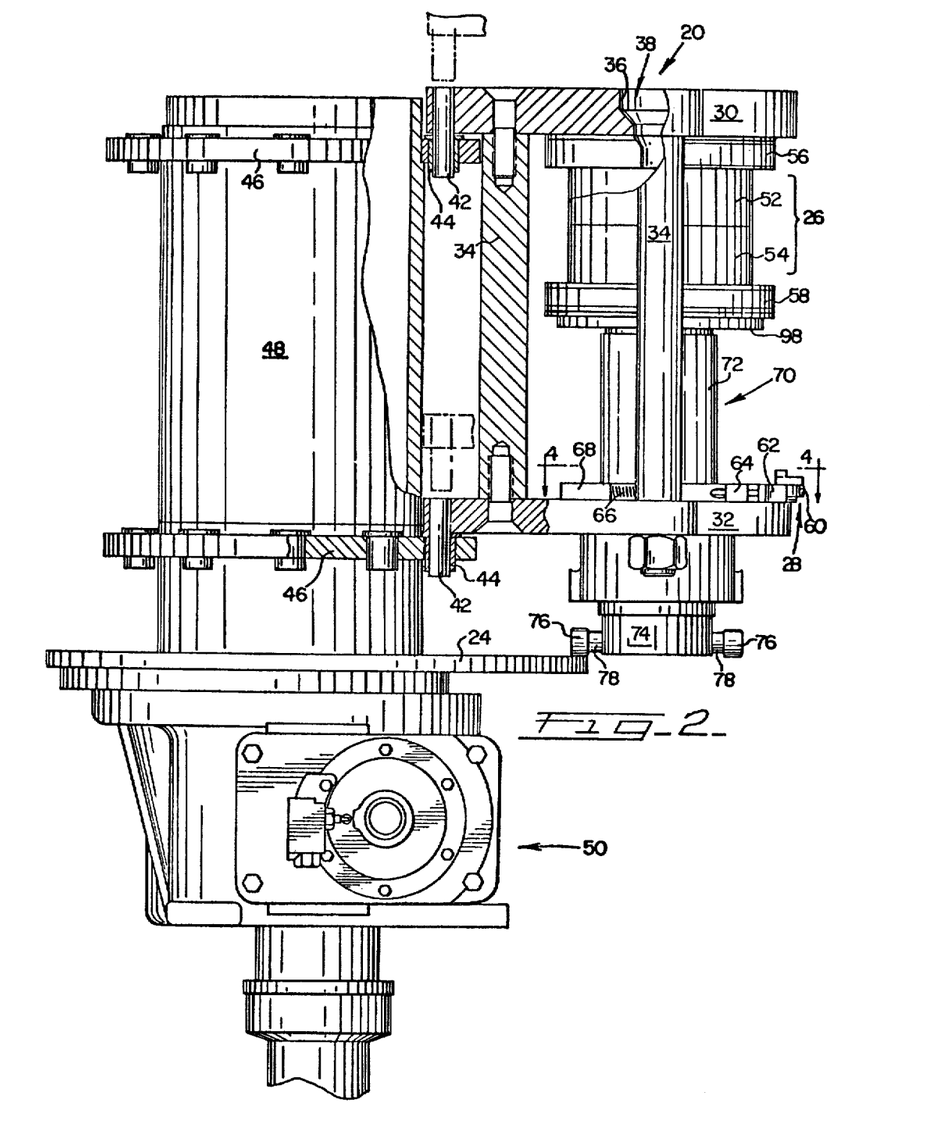
FIG. 2 is a side view, partly in section and partly in elevation, showing a major portion of the turntable drive unit and a cross section of one individual molding station.

Referring now to FIG. 2, it is shown that each individual molding station 20 is made up of a number of principal components including an upper plate 30, a lower plate 32, and a plurality of vertical, load bearing columns 34. Side wall portions 36 in the top plate 30 define an opening 38 for reception of the nozzle portion 40 (FIG. 5) of the material injector 14. Both upper and lower plates 30, 32 include a pair of cylindrical mounting studs 42 extending through bushings 44 which are held within suitably sized openings in upper and lower rings 46 fixedly mounted on a rotatable center column generally designated 48. Thus, the column 48 and the ring 46 having the bushings 44 therein serves as a turntable which may have its individual stations 20 indexed successively into a desired position by indexing means in the form of a cam drive generally designated 50. This drive may be of any type well known to those skilled in the art, and the details of the drive do not form a part of the present invention which is novel per se.

Referring again to each individual molding station 20, only one of which is shown in FIG. 2 for purposes of clarity, it will be seen that the mold assembly 26 comprises upper and lower mold parts or halves 52, 54 respectively, with a heating platen 56, 58 associated with each mold part 52, 54. These platen 56, 58 are customarily heated to a desired temperature by electrical resistance heaters and maintained at this temperature by control units of a well known type not forming a part of the invention which is novel per se. FIG. 2 also shows that the locking assembly for each station includes a locking roller 60, located radially outwardly of a locking actuator 62, and that a locking collar 64 is spaced inwardly therefrom. The collar 64 is resiliently connected, as by two springs 66, to a fixed element 68 located radailly inwardly thereof. Further details of the operational mode of the locking mechanism 28 are contained elsewhere herein.

Referring now to another principal portion of the apparatus shown in FIG. 2, it will be seen that beneath the platen 58 is a cylindrical member generally designated 70 and having an upper portion 72, a lower portion 74, and including a pair of support rollers 76 mounted on stub shafts 70, with the roller 76 being adapted to rest upon the upper surface of the track 24 to maintain the mold assembly 26 in the position shown, that is, with the lower mold half 54 spaced slightly below the upper mold half 52, for reasons which will presently appear.

Figures 3, 4:
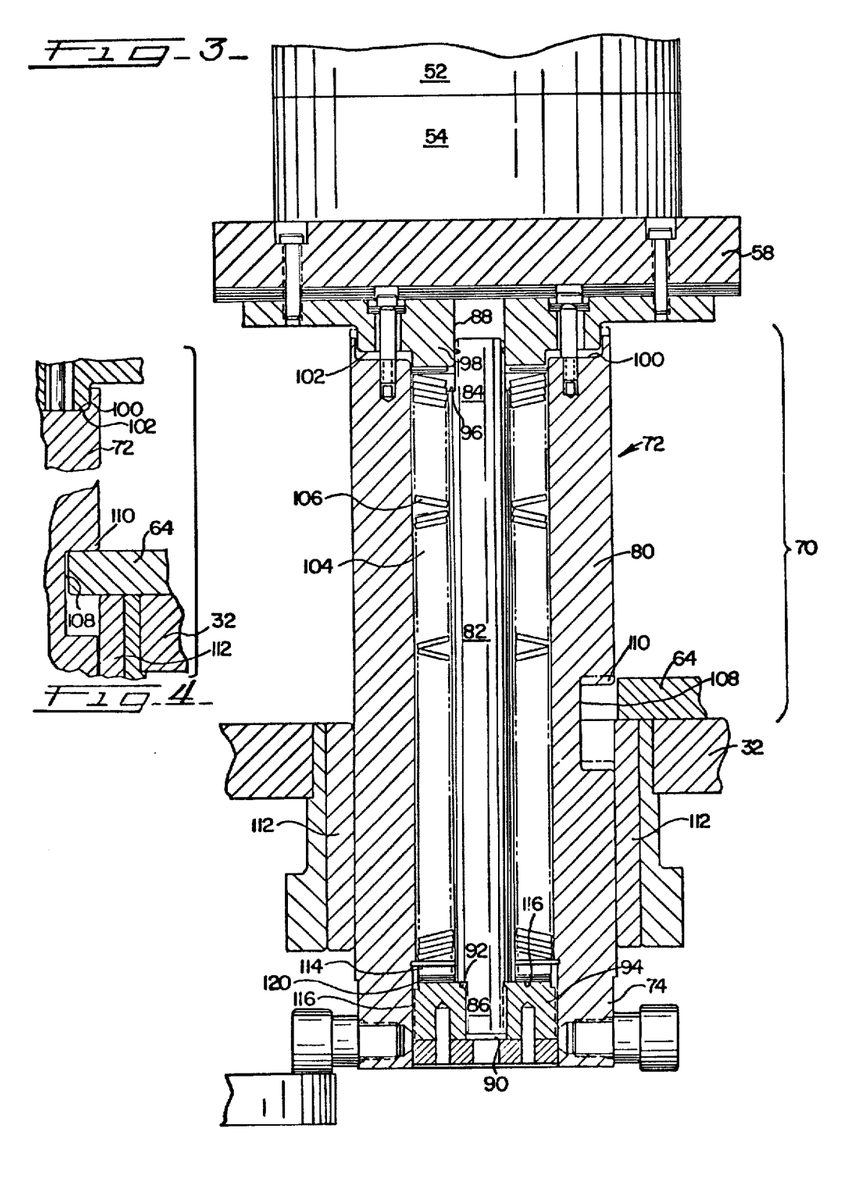
FIG. 3 is a further enlarged side view, partly in elevation and partly in section, showing the lower part of one molding station, including the mechanical means used to maintain the station in the closed position under a predetermined force.
FIG. 4 is a fragmentary vertical sectional view similar to that of FIG. 3 and showing certain elements thereof in an alternate position of use.

Referring now to FIG. 3, the structure of the cylindrical member 70 is shown in greater detail, and as may be noted from FIG. 3, the member 70 includes an outer sleeve 80, a reduced diameter center rod 82 having further reduced diameter upper and lower end portions 84, 86 received within oppositely disposed and coaxially aligned center openings 88, 90. At the bottom portion 74 of the assembly 70 the shoulder 92 of the rod 82 rests on a base element 94, while the upper shoulder 96 of the rod 82 is somewhat spaced apart from an oppositely disposed portion of the support 98 for the platen 58. It will also be noted that the upper space 100 of the sleeve 80 is spaced apart from a downwardly directed surface 102 of the support unit 98 in the position shown in FIG. 3.

In the annular opening 104 defined between the inner and outer surfaces respectively of the sleeve 80 of the rod 82 are disposed a large plurality of dished washers or Belleville springs 106. By reference to FIG. 3, it will be noted that the base 94 and the sleeve 80 being fixed relative to each other, relative upward movement of these parts will exert a compressive force on the springs 106, which will be exerted through the springs and onto the support element 98, thus urging the lower mold half 54 into contact with the upper mold half 56 and permitting exertion of an additional force thereon. As the mold halves, 54, 56 are forced together, and an upward force continues to be exerted on the members 90, 94, additional mold closing force is exerted until the Belleville springs 106 have been compressed to a predetermined degree. At this point, the surfaces 100, 102 are in abutting relation, and forces are then transmitted directly mechanically through the cylinder 80 to the support 98 and thence through the heating platen 58 to the lower mold half 54.

Referring again to FIG. 3, it may also be noted that an arcuate slot 108 is cut in the radially outwardly facing portion of the cylinder 80. In FIG. 3 the phantom lines show that slight upward movement of the cylinder 80 in respsect to the bottom plate 32 will raise the shoulder portion 110 of the notch above the height of the collar 64, permitting it to snap into position within the groove 108, and thereby prevent relative downward movement of the sleeve 80. Under these conditions, whatever axial pre-load is applied to the cylinder 80 by the collar and plate 32 acting thereagainst will be maintained without the need for providing an independent upward force on the cylinder 80 or the base portion 94. The cylinder assembly 70 itself is kept aligned in the plate 32 by the keys 112 in the bushings 113.

It will also be noted by reference to FIG. 3 that a spacer 114 is provided for insertion between the lower surface of the bottom spring 106 and the upper surface 116 of the base portion 94. Threads 117 are provided on oppositely directed surfaces respectively of the base or plug 94 and the cylinder 80, and shims 120 are also provided so that adjustment of the plug 94 may be made by spacers and shims, as well as by rotation of the base or plug 94 to achieve the desired initial pre-load force on the lower mold half 54.

Figure 5:
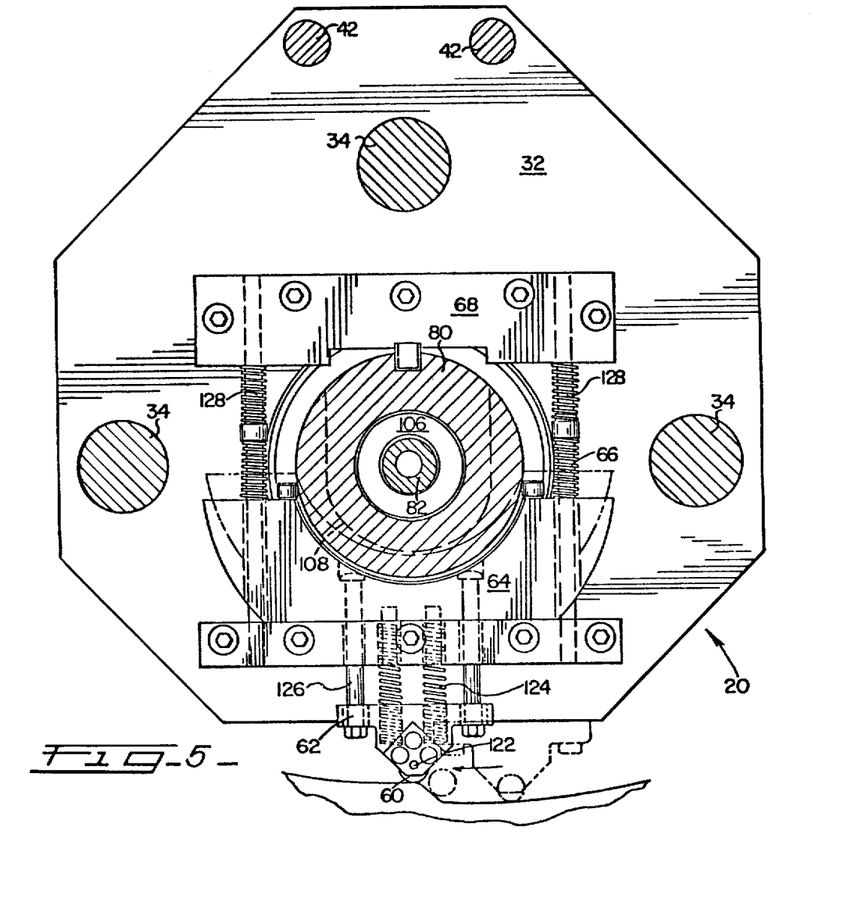
FIG. 5 is a horizontal sectional view, taken along lines 5—5 of FIG. 2 and showing the means for holding each individual molding station in the closed position thereof against a relatively lower force.

Referring now to FIG. 5, the details of the locking mechanism are shown to include a roller unit 60 mounted upon an axle 122 for rotation and so that radial thrust in the direction of the arrow will move the follower element 62 radially inwardly, pre-loading the biasing means in the form of the springs 124. Guide means in the form of rods 126 serve to maintain proper alignment of the locking collar 64 with respect to the cutout 108. It will also be noted that the springs 66 which are disposed over alignment shaft 128 exert a force which is oppositely directed in relation to the force exerted by the follower 62 through the springs 124. The pairs of springs 66, 124, are so arranged that, with the follower 62 positioned in the solid line position of FIG. 5, the force of the springs 124 overcomes the force of springs 66, and will permit the collar 64 to move to its locked or phantom line position, provided the shoulder (FIGS. 3 and 4) of the groove 108 is raised sufficiently. With the follower 62 in the broken line or open or uncompressed position, however, the force of the pair of springs 66 is sufficiently great to maintain the collar 64 in its open or solid line position. Thus, in the use of the apparatus, the roller 60 is engaged by a cam surface 125 or other fixed part of the main frame 12, just prior to the time an individual station 20 is indexed beneath the injection assembly. This builds up compressive force in or preloads the springs 124 and urges the collar 64 towards the locked position. However, at this point, although the mold halves 54, 56 are nearly or fully closed, there is still interference (FIGS. 3 and 4) between a leading edge portion of the collar 64 and the shoulder 110 forming a part of the notch 108. It is only when further compression is applied axially to the assembly 70 by the large clamping piston 130 (FIG. 6) that the cylinder 80 moves up sufficiently to permit the collar 64 to snap in position (FIG. 4). Subsequently, even after release of the high clamping force, the collar 64 remains pinched in the closed position by the downward force exerted by the springs 106 and tending to move the cylinder 80 down relative to the plate 32. Upon indexing of any individual unit 20 away from the position of registry beneath the injector 14, the roller 60 and follower assembly 62 release and are snapped to the outward or phantom line position of FIG. 5; the collar 64, however, remains locked, since the force of the springs 66 is not sufficient to move it outwardly against the pinching force developed between the shoulder 110 and the bottom plate 32. Accordingly, a second or auxiliary unloading piston and cylinder assembly 144 (FIG. 6) is provided to exert sufficient upward force on the plug 94 or bottom portion of the cylinder 80 to release the pinching force and permit the collar 64 to snap open again. Thus, if a force of 30 tons is maintained on the mold halves 52, 54 when the collar 64 locks the cylinder 80 to the plate 32, a force of 30 tons or somewhat more is required to overcome the preload and permit release of the collar 64.

Figure 6:
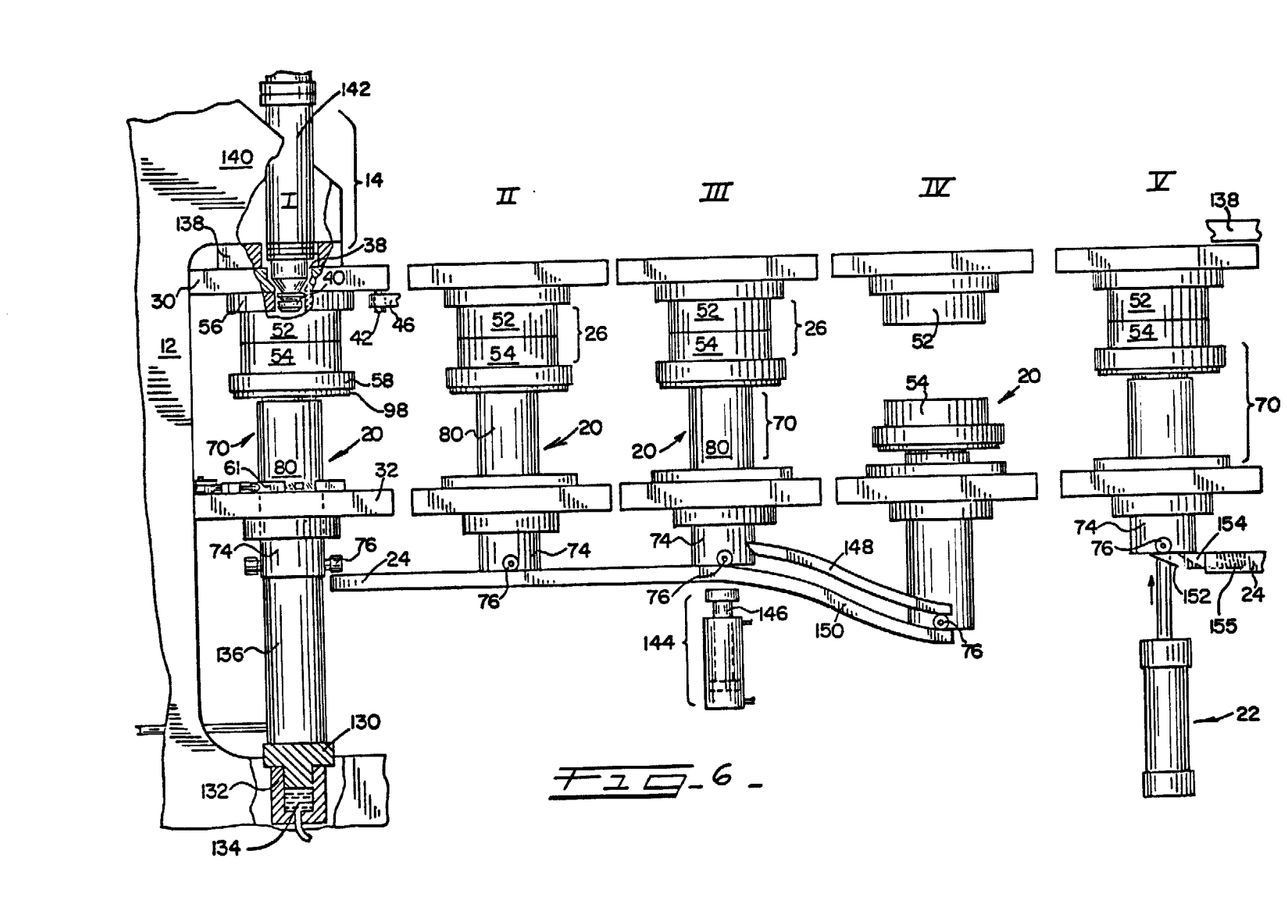
FIG. 6 is a developed view, with portions broken away, showing the operating sequence of the machine and showing somewhat diagrammatically the apparatus for clamping the individual molding stations under a very high force during injection of moldable material therein.

Referring now to FIG. 6, the operating sequence of the apparatus is shown. At station I, a given individual unit 20 is moved into position in the clamping frame 12, a clamping piston schematically illustrated at 130 and shown to be disposed within a cylinder 132 is capable of being urged upwardly under pressure of hydraulic fluid 134 to move the anvil 136 against the lower portion 74 of the assembly 70, permitting the pre-loaded collar 64 to snap into the closed position of engagement thereof with the groove 108, slightly raising the roller 76 above the track 24. Moreover, since the opposed surfaces 100, 102 of the cylinder 80 and the mold support 98 respectively, are engaged, there is minimum clearance between the upper, outer edge of the cylinder 80 and the support 98. Once the springs 106 are compressed to this degree, further clamping forces are exerted exclusively through parts which are solidly locked together, namely, through the cylinder 80, the support 98 and mold halves 52, and 54 and the platens 56, 58.

Since the upper and lower plates 30, 32 are allowed to float in respect to the ring 46, the entire station is then lifted slightly from the ring 46 while the studs 42 continue to locate the station 20 with respect to the ring. The reaction to the high clamping force is absorbed by the plate 138 disposed beneath the gusset portion 140 of the clamping frame 12. Contemporaneously with the exertion of the high clamping force, which might typically be one hundred tons, the nozzle 40 of the injector 142 and a fluent, moldable material, preferably a thermosetting material such as rubber or the like, is injected into the sprues and runners of the mold. After a short time, typically 5 to 60 seconds, the injector head 142 is axially withdrawn through the opening 38 in the upper plate 30, and the large force supplied by the clamping piston 130 is released. As pointed out above, however, the mold remains fully closed under reduced but substantial force, since the collar 64 clamps the same in the closed position. The indexing mechanism 50 is then operated through one cycle, and the station 20 is moved to a position numbered II. At this point, in the case of a thermosetting material, the rubber or like article held within the mold assembly 26 is in the process of being cured, and having not completely set or cured, it must be maintained under the reduced but still definite force referred to above. This force continues to be applied as long as the locking collar 64 remains in the slot 108 and maintains the spring force acting on the lower plate 32 through the springs 106, and urging the plate 98, platen 58 and mold half 54 upward. At this station, cure continues but there is no relative movement among parts of the assembly 26.

After another injection cycle has taken place, the particular molding station 20 is indexed to a position designated III. At this station, an auxiliary piston and cylinder apparatus generally designated 144 and having an extended piston 146, is disposed beneath the lower portion 74 of the assembly 70. Again, the mold assembly 26 is permitted to remain in the closed position throughout most of the time the station 20 is in position III, locked by the collar 62 and maintained under the spring force developed by the almost fully compressed springs 106. Just prior to indexing to the next position, however, the piston 146 of the assembly 144 is moved upwardly under a force at least somewhat greater than the locking force generated by the springs 106. As the cylinder 80 is moved upwardly, the collar 64 is released under the force of the springs 66 and snapped radially outwardly to the released or solid line position shown in FIG. 5, while the follower moves fully to the phantom line position thereof shown in FIG. 5. Thereupon, additional rotation of the column 48 moves the station 20 to the position shown at IV. As shown in FIG. 6, positive separation of the mold halves 52, 54 is accomplished by engagement of the roller 76 with a pair of spaced apart cam rails 148, 150, and rotatory movement of the station 20 with the roller between the rails 148, 150. Although it will be understood that gravitational forces serve to urge the mold halves 50, 52 apart from each other, there is often a certain amount of adhesion developed between the molded material in the mold part, or the presence of undercuts or the like in the mold serve to lock the mold halves together under a slight but definite force. Accordingly, the provision of unlocking means such as those provided by the cam rails 148, 150 to act positively on the rollers 76 are preferably but not necessarily provided. At station IV, finished parts may be removed in a customary manner, and assuming that an article such as an oil seal or other like part is being manufactured which will include, in finished form, a stiffener or insert such as metal stamping or the like, such stiffener may be placed in the open mold at this time. After this has been accomplished, the turntable may again be indexed, such as to the position shown in station V. At this station, the first auxiliary piston and cylinder assembly 22 is used to raise the assembly 70 into a closed or nearly closed position. This is carried out by raising the lower portion 74 of the assembly 70 until the upper surface of the roller 76 contacts the inclined surface 152 of the locking latch assembly 154 forming the end portion of the rail 24. As continued upward force is exerted, the latch 152 is cammed aside, or to the right-hand, broken line position of station V against the resistance of the spring 155. Continued upward motion permits the latch 152 to snap back to the solid line position shown, whereupon the lower assembly 70 is supported in a closed or nearly closed relation, with the insert or the like held between the mold halves. Indexing of the column 48 to the next station (station I) serves to preload the locking collar 64 by movement of the follower 62, so that exertion of the clamping force by piston 130 will cause locking of the mold halves 52, 54 together as previously pointed out.

Referring now to certain general aspects and features of the invention, it will be appreciated that a molding apparatus of the type in question combines a number of novel features which result in improvements and advantages in operating speed and economy of construction. For example, a drawback which has been characteristically associated with injection molding presses able to manufacture parts requiring high force clamping is that such units are ordinarily made very massive to withstand the static forces placed on them in being clamped under high tonnage. Consequently, those parts of the apparatus subjected to the clamping action were required to be very massive to resist bending or buckling deflection. Moreover, the parts supporting the mold parts themselves were required to be very massive in most cases, since the supporting parts, such as portions of the turntable, were also directly subjected to the clamping force applied to the molds. In certain constructions, the turntable was able to be made relatively light, however, in such constructions, the molding stations and the turntable were required to be very precisely sized so as to move with minimal clearance between a fixed and movable clamping element without placing stresses on the turntable which might cause damage thereto.

In constructions wherein two freely movable pistons having parallel hydraulic feed lines were used, the stress on supporting members could be minimized, but in such constructions injection could not be made coaxial with force application, since the pistons obstructed both ends of the molds, and injection would generate high forces along another axis. The prior art also includes molding presses wherein the entire turntable is positioned so that the individual molds are moved by complex auxiliary equipment to an exact position of use in the clamping assembly, while the prior art includes other constructions in which mass was simply added to obtain the requisite strength. However, mass not only undesirably increases the cost of an apparatus, but adds great expense to or makes impossible rapid operating cycles in rotary machines, since the mass in question must be started and stopped a number of times for each machine cycle, thereby utilizing high power and generating unnecessary heat.

In one case, the "floating" station concept of the present invention has been incorporated with excellent results, and this concept has made it possible to concentrate mass only in those places where the mold assembly is placed under direct high compressive load forces. However, an apparatus of this type has required the use of extensive hydraulic circuitry and operation of such machines is complex and sometimes unreliable. In such a device, an opening and closing hydraulic mechanism was necessarily associated with each station, requiring a large number of piston and cylinder assemblies, in the case of multi-station units. Moreover, the hydraulic system required joints capable of withstanding relative motion, and noise and expense associated with machines of this type are often quite considerable.

The present invention retains all the advantages of all-hydraulic molding presses with floating stations; however, the improved form thereof described herein provides a number of advantages and characteristics not previously associated with the prior art devices. For example, locking and unlocking may be carried out reliably and positively in regard to predetermined loading conditions rather than relying on the accuracy of pressure regulators or the like. Only a limited number of mechanisms is required to be provided to attend to opening and closing the molds, rather than one opening and closing assembly for each molding station. Accordingly, the construction features of the present invention provide a machine which is capable of developing the most force for the most limited size of physical structure and which promises improved reliability in use. Moreover, another novel feature of the invention is that each individual molding station 20 may be readily removed as a unit from the turntable merely by lifting the station a sufficient amount to clear the studs 42 from the bushings 44 and the rings 46 in which they are retained, then removing the station radially outwardly. This is important not only from the standpoint of simplicity of molding changing during production and minimum downtime for repairs, but also is important where it may be desired to physically remove the molding stations and place them in another environment while preloaded. Thus, articles made in such molds may be postcured while under pressure and the molds containing such articles can thereafter be returned to their positions on the machine for opening, part removal, insert feeding, closing and clamping and injection. In this connection, it should be pointed out that a particular advantage of multi-station rotary injection molds is that plural part types and/or sizes may be simultaneously run on the same machine. Therefore, the ability to remove mold stations for tooling changes and to replace the entire station for such time is further advantageous because full production can be continued even during the time a mold change is being made. The compact design of the spring package used to maintain the preload force enables the entire station to be made small and to be placed on a minimum radius to decrease inertial effects of the apparatus in use and permit a rapid operating rate to be carried out. The novel locking means is simple and effective, and provides for easy preload force adjustment.

In the illustrated embodiment, the means for applying the large clamping force was shown as a hydraulic piston and cylinder assembly, however, it will be understood that a mechanical clamping arrangement might be used in place of the hydraulic unit, such as a mechanical screw type movement, a toggle action movement or a crankpin movement, for example. The spring means associated with each individual station was shown to be in the form of a stack of Belleville springs or washers, but it will be understood that other forms of springs might be provided, including coil springs or the like. It will also be understood that a piston and cylinder assembly might be provided to preload the molding station prior to indexing thereof to the clamping position, and that a single piston and cylinder or its equivalent might be used both to unload the locked mold assembly and to relock it at the same station. It will also be understood that the number of stations provided does not form a necessary part of the invention and that more or fewer stations might be provided, including stations allowing for the performance of auxiliary functions. The form of mechanical lock shown is advantageous and is preferred for use with the invention, but, other forms of locking means might be substituted for the illustrated form.

A preferred form of molding apparatus made according to the invention has been illustrated and shown to provide a number of advantages and characteristics including those expressly pointed out and others which are inherent in the invention. Such form of apparatus having been shown by way of example, it is anticipated that modifications and changes thereto will be apparent to those skilled in the art, and it will be understood that such modifications and changes may be made without departing from the spirit of the invention or the scope of the appended claims.

We claim:

1. A molding station having a pair of spaced apart opposed frame members connected to each other by a frame support, first and second mold support parts arranged for movement relative to each other between open and closed positions, said mold support parts being disposed between said frame members, at least one of said mold support parts, in the closed position thereof, being supported by one of said frame members, a column assembly having a part supporting one of said mold support parts and being movable along a given axis with respect to one of said frame members, said column assembly including inner and outer elements relatively movable axially of each other and normally biased apart by resilient means, lock-receiving means in one of said inner and outer elements, a lock unit having a portion thereof movable relative to and supported by one of said frame members, said lock-receiving means being arranged so as to receive said lock therein only in a position of one of said inner and outer elements wherein said resilient means is at least partially compressed, whereby a predetermined locking force may be applied through said resilient means to said mold support parts to lock said mold support parts into the closed position thereof by locking one of said column elements with respect to said one frame member.

2. A molding station as defined in claim 1 wherein one of said inner and outer elements and one of said mold support parts each includes oppositely directed, mutually opposed surfaces engageable directly with each other in a biased together position of said resilient means, whereby mold closing forces transmitted to one of said column elements will be transmitted directly to one of said mold support parts, with the other of said mold support parts being supported directly by said frame member.

3. A molding station as defined in claim 1 wherein said lock unit includes a locking element movable toward and away from one of said inner and outer column elements, a locking element positioner, first resilient means disposed between said positioner and said locking element and normally urging said locking element away from said one column element, a positionable follower mounted for movement relative to said locking element and said positioner, second resilient means disposed between said follower and said locking element, said follower, said positioner, said locking element and both of said resilient means being arranged so that, in one position of said follower, said locking element is urged by said second resilient means toward a position of engagement with said one column element, and, in another position of said follower, said locking element is urged by said first resilient means away from a position of engagement with said one column element.

4. A molding station as defined in claim 3 wherein said one column element is a cylindrical member movable perpendicular to said locking element, said locking element being in the form of a collar unit and said lock-receiving means being in the form of an arcuate, collar-receiving groove in said one column element.

5. A molding station as defined in claim 3 wherein said one column element is mounted for movement perpendicular to said locking element and to one of said frame members, and wherein said lock-receiving means is sized and positioned such that movement of said one column element to at least a predetermined extent relative to said frame member is required in order to expose said lock-receiving means in said one column element sufficiently to permit reception therein of said locking element.

6. A mold station as defined in claim 1 wherein said inner and outer elements comprise a concentrically arranged rod and sleeve, said resilient means being disposed in an open area between said rod and sleeve.

7. A molding station as defined in claim 1 wherein said lock receiving means is in the form of a recess in said outer element, and wherein said portion of said lock unit includes a collar receivable therein.

8. A molding station as defined in claim 1 wherein said resilient means comprises a plurality of concentrically arranged Belleville washers.

* * * * *